(12) United States Patent
Häberle et al.

(10) Patent No.: US 12,420,286 B2
(45) Date of Patent: Sep. 23, 2025

(54) OVERLOAD PROTECTION DEVICE FOR THE HYDRAULIC SYSTEM OF A MINERAL MATERIAL MACHINING PLANT

(71) Applicant: Kleemann GmbH, Göppingen (DE)

(72) Inventors: Steffen Häberle, Herbrechtingen (DE); Gerd Meyer, Amstetten (DE)

(73) Assignee: Kleemann GmbH, Göppingen (DE)

( * ) Notice: Subject to any disclaimer, the term of this patent is extended or adjusted under 35 U.S.C. 154(b) by 363 days.

(21) Appl. No.: 18/099,993

(22) Filed: Jan. 23, 2023

(65) Prior Publication Data
US 2023/0241617 A1    Aug. 3, 2023

(30) Foreign Application Priority Data

Feb. 1, 2022  (DE) .................. 10 2022 102 283.8

(51) Int. Cl.
*B02C 1/02* (2006.01)
*B02C 1/08* (2006.01)
(Continued)

(52) U.S. Cl.
CPC .............. *B02C 1/025* (2013.01); *B02C 1/08* (2013.01); *B02C 13/31* (2013.01); *B02C 23/04* (2013.01);
(Continued)

(58) Field of Classification Search
CPC .......... B02C 1/025; B02C 1/08; B02C 13/31; B02C 23/04; F16P 5/005; F16P 7/00; F16H 35/10; F16K 17/16; F16K 17/40
(Continued)

(56) References Cited

U.S. PATENT DOCUMENTS 2,663,458 A  *  12/1953  Macglashan, Jr. .... F16K 17/162
                                                                220/89.2
3,109,553 A  *  11/1963  Fike ...................... F16K 17/403
                                                                220/89.2
(Continued)

FOREIGN PATENT DOCUMENTS

DE         102010015583 B4      7/2018

OTHER PUBLICATIONS

German Office Action for corresponding patent application DE 10 2022 102 283.8, dated Oct. 24, 2022, 4 pages.

*Primary Examiner* — Jared O Brown
*Assistant Examiner* — Matthew Stephens
(74) *Attorney, Agent, or Firm* — Lucian Wayne Beavers; Patterson Intellectual Property Law, PC

(57) ABSTRACT

A mineral material machining plant includes a hydraulic element including a connection area and a passage opening. An overload protection device includes a replaceable burst panel covering the passage opening. The burst panel includes a rear face, at least one bore, and at least one recess having a lateral insertion section open towards one side of the burst panel. A burst panel holder engages the rear face. In an assembled condition at least one fastening bolt passes through a bolt mount of the burst panel holder, the bore of the burst panel, and is threaded into a threaded mount of the connection area. In a disassembled condition at least one retaining element connects the burst panel holder to the hydraulic element and can be inserted laterally into and removed from the recess transversely to a plate plane of the burst panel.

14 Claims, 5 Drawing Sheets

(51) Int. Cl.
*B02C 13/31* (2006.01)
*B02C 23/04* (2006.01)
*F16K 17/16* (2006.01)
*F16K 17/40* (2006.01)
*F16P 5/00* (2006.01)
*F16P 7/00* (2006.01)

(52) U.S. Cl.
CPC .............. *F16K 17/16* (2013.01); *F16K 17/40* (2013.01); *F16P 5/005* (2013.01); *F16P 7/00* (2013.01)

(58) Field of Classification Search
USPC ..... 220/89.1, 89.2; 137/68.19, 68.23, 68, 21
See application file for complete search history.

(56) References Cited

U.S. PATENT DOCUMENTS

| | | | | |
|---|---|---|---|---|
| 3,388,552 | A * | 6/1968 | Bilton | F16D 33/18 |
| | | | | 60/329 |
| 3,480,301 | A * | 11/1969 | Kroening | F16L 23/18 |
| | | | | 277/609 |
| 4,751,938 | A * | 6/1988 | Kerns | F16K 17/162 |
| | | | | 285/31 |
| 2013/0180984 | A1 * | 7/2013 | Wilson | B65D 90/36 |
| | | | | 220/89.2 |

\* cited by examiner

OVERLOAD PROTECTION DEVICE FOR THE HYDRAULIC SYSTEM OF A MINERAL MATERIAL MACHINING PLANT

BACKGROUND OF THE DISCLOSURE

The invention relates to an overload protection device for the hydraulic system of a mineral material machining plant, in particular for a rotary impact crusher, a jaw crusher or the like, wherein a hydraulic element equipped to store and/or convey a hydraulic fluid is provided, wherein the hydraulic element comprises a connection area having a passage opening for the hydraulic fluid of the hydraulic system, wherein the passage opening is covered by a replaceable burst panel, wherein a burst panel holder is disposed on the rear face of the burst panel facing away from the connection area and wherein at least one fastening bolt is passed through a bolt mount of the burst panel holder and through a bore of the burst panel disposed in alignment therewith and is bolted into a threaded mount of the connection area in such a way that in the assembled state the burst panel is held clamped between a pressure surface of the burst panel holder and a connection surface of the connection area.

DESCRIPTION OF THE PRIOR ART

A mineral material machining plant, specifically a rotary impact crusher, is known from DE 10 2010 015 583 B4. This rotary impact crusher has a crusher unit with a crushing rotor. Radially outwards, the crushing rotor has a plurality of impact bars that define an impact circle. Opposite from the crushing rotor, there is at least one wall element in the form of an impact rocker. A crushing gap is formed between the impact rocker and the impact circle.

During operation, the material to be crushed is fed into the crusher unit. There, the impact bars hurl it radially outwards. The material then hits the impact rocker, crushing it. As soon as the material has a grain size smaller than the crushing gap, it falls through the crushing gap and exits the area of the crusher unit. A crusher discharge conveyor is located below the crusher unit. It can be used to remove the crushed material.

In impact crushers, a hydraulic cylinder usually supports the impact rocker against the crusher chassis. The hydraulic cylinder can be used to set and maintain the size of the crushing gap to the required size.

In the event that non-crushable material enters the crushing space of the crusher unit and cannot escape through the set crushing gap, an overload protection device is provided.

The overload protection device can have a so-called burst panel. The burst panel seals a passage opening of the hydraulic cylinder. If an excessive force acts on the impact rocker (as in the case of non-crushable material in the crushing space) and thus also on the supporting hydraulic cylinder, this results in excessive pressure that is harmful to the system. To protect the hydraulic system and prevent damage, the burst panel then breaks. Then the hydraulic oil can escape from the hydraulic cylinder through the passage opening and the hydraulic cylinder can retract. Accordingly, the impact rocker can move aside and the crushing gap opens. The non-crushable material can then escape through the crushing gap opened in this way.

The burst panel is clamped between the housing of the hydraulic cylinder and a burst panel holder. Typically, this involves the use of bolts that pass through bores in the burst panel holder and in the burst panel and are bolted into the hydraulic cylinder.

After an overload event, the burst panel has to be replaced. For this purpose, the fastening bolts have to be loosened and the burst panel holder removed. The burst panel holder has to be loosened carefully; otherwise hydraulic oil may leak. Furthermore, in the confined installation space of the processing plant, it is not always easy to align and attach the burst panel holder to the hydraulic cylinder.

SUMMARY OF THE DISCLOSURE

The invention addresses the problem of providing an overload protection device of the type mentioned above, which provides improved easy maintenance after an overload event.

This problem is solved by providing at least one retaining element, which, in a dismantling position, holds the burst panel holder to the hydraulic element, in particular at the connection area, when the at least one fastening bolt is unbolted from the threaded mount of the connection area and the burst panel is removed.

If the overload protection device has tripped after an overload event, the burst panel has to be replaced. According to the invention, this is accomplished simply by removing the mounting bolts and disconnecting the burst panel connection in the clamping area between the burst panel holder and the connection area. Then the burst panel can be removed. In this dismantling position, the retaining element holds the burst panel holder to the connection area. This then prevents hydraulic oil, which is located in the burst panel holder, from leaking. A new burst panel can then be inserted in place of the damaged burst panel. The burst panel holder can then be reattached. Because the retaining element is used to hold the burst panel holder in position with, this is simple to accomplish. The installer now only has to reinsert the fastening bolts and bolt them into the threaded mounts of the connection area. Afterwards, the overload protection device can be used again.

Preferably, when the fastening bolts are removed, the retaining element then restricts the burst panel holder in terms of its motion options such that it can only be moved with one degree of freedom or with two degrees of freedom. For instance, the retaining element is designed in such a way that the burst panel holder can only be rotated relative to the connection area (one degree of freedom) or that it can only be rotated relative to the retaining element and displaced transversely to the plate plane of the burst panel.

According to a preferred variant of the invention, provision is made for the burst panel to comprise one or more recesses, which have a lateral insertion section, wherein the insertion section opens the recess towards one side extending transversely to the plate plane of the burst panel such that the retaining element can be inserted laterally into the recess transversely to the plate plane of the burst element and removed therefrom. Once the mounting bolts are removed, the burst panel can be pulled from the area between the burst panel holder and the mounting area. The retaining element remains in its position. When the new burst panel is then inserted, it can simply be pushed onto the retaining element first. The retaining element moves through the insertion section into the recess. Accordingly, the positioning of the burst panel is reliable and unambiguous even in complex mounting conditions. Furthermore, this also results in a space-saving design.

A particularly simple design results when provision is made for the retaining element to be formed by a bolt.

Preferably, provision can also be made in this case for this bolt to engage with a bolt section in the recess, and for the retaining element to pass through a bolt mount of the burst panel holder and the recess and to be bolted into a threaded mount formed in the connection surface of the connection area. Preferably, it is possible here to use the retaining element in addition to the fastening bolts for bracing the burst panel holder.

If provision is made for the planar front face of the burst panel to rest on the connection surface of the connection area and for an opposite planar rear face to rest on the pressure surface of the burst panel holder and for the burst panel to be held clamped between the connection surface and the pressure surface, then it is sufficient if the distance of the burst panel holder from the mounting area increases slightly after the clamp connection has been released (and fastening bolts have been removed). Dismantling the burst panel is then easy, as it can be pulled out laterally from its mounting position without blocking. Conversely, the new burst panel can then be easily inserted into the gap area between the burst panel holder and the mounting area. This further reduces the risk of an oil leakage.

A particularly advantageous embodiment results when provision is made for the retaining element to form a swivel bearing with a section of the burst panel, in particular with the recess, the swivel axis of which swivel bearing is transverse to the connection surface, in such a way that the burst panel can then be swiveled out of its mounting position transversely to the connection surface when the fastening bolts are removed. This increases the ease of assembly. In particular, the new burst panel can be pre-positioned on the swivel bearing and then easily moved into the swiveled-in mounting position.

According to the invention, it can be provided that the burst panel has a burst piece having a predetermined breaking point, which is preferably in the form of a cross-sectional weakening. In particular, the burst piece can be connected to the burst panel via the predetermined breaking point in such a way that it is completely blown off in the event of an overload. Preferably, the burst piece may optionally remain integrally connected to the burst panel via a section of material in the event of an overload.

If provision is made for the burst panel holder to have a lead-through, which is covered by the burst panel in the mounted state of the burst panel holder, for a channel section of the burst panel holder to adjoin the lead-through, and for the channel section to lead to a line connection, which connects or can be used to connect a hydraulic line to the burst panel holder, then it is guaranteed that the burst panel can be reliably triggered in the direction of the lead-through. For this purpose, the lead-through provides an area into which the burst panel can be deformed. In addition, the escaping hydraulic oil can be collected in the channel section of the burst panel holder and then discharged into a discharging line system or directed into a collecting tank in an orderly manner via the line connection.

A preferred overload protection device in the context of this invention is such that the hydraulic element is a hydraulic cylinder, which has a cylinder housing, in which a piston is adjustably guided, wherein a piston rod is connected to the piston and the piston rod head of which is guided out of the hydraulic cylinder, wherein the piston delimits a pressure chamber, and wherein the pressure chamber is spatially connected to the passage opening of the connection area. Preferably, the burst panel is positioned in such a way that in the assembly position the burst panel plane extends transverse, in particular perpendicular, to the direction of motion of the piston. This facilitates access to the overload protection device and thus the assembly or dismantling of the burst panel.

Here also preferably provision can be made for the hydraulic cylinder, preferably its piston rod, to be coupled to a wall element of a crusher unit by means of a swivel bearing, and for the wall element to be held in a swiveling manner on a chassis by means of a bearing, wherein preferably provision is made for the wall element to be an impact rocker of a rotary impact crusher.

The problem of the invention is also solved by a method for repairing an overload protection device of a mineral material machining plant, wherein the overload protection device is designed according to any of the claims 1 to 9, wherein the fastening bolts are loosened and removed, while the retaining element keeps the burst panel holder connected to the connection area, wherein the burst panel of the overload protection device is then removed and a new burst panel is inserted into the overload protection device, and wherein the fastening bolts are then reinserted into the bolt mounts of the burst panel holder and into the bores of the new burst panel and bolted into the threaded mounts of the connection area.

BRIEF DESCRIPTION OF THE DRAWINGS

The invention is explained in greater detail below based on an exemplary embodiment shown in the drawings. In the Figures.

DETAILED DESCRIPTION

Figure 1:
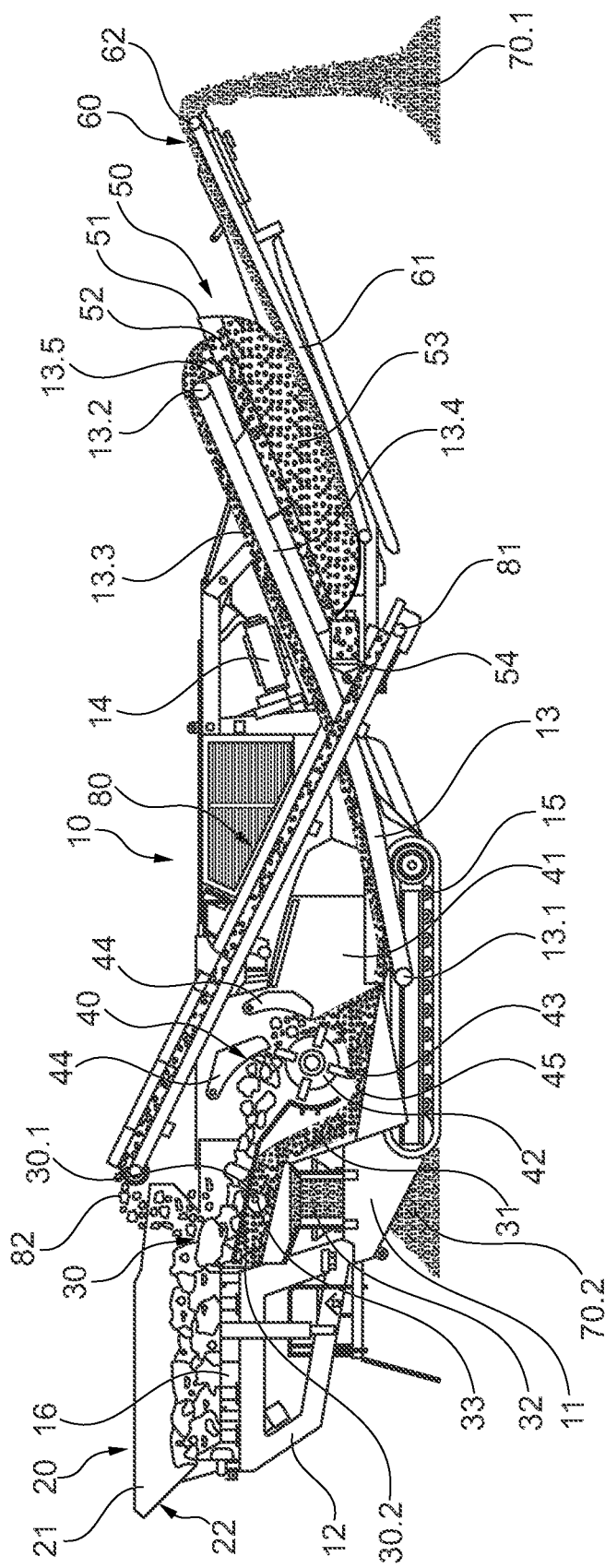
FIG. 1 shows a schematic side view of a crusher.

FIG. 1 shows a processing plant in the form of a crusher 10. The crusher 10 is designed as a mobile crusher and therefore has undercarriages 15. However, it is also conceivable that the crusher 10 is a stationary crusher.

The crusher 10 has a chassis 11 that supports the machine components or at least a part of the machine components. At its rear end, the chassis 11 has a cantilever 12. A material feed area is formed in the area of the cantilever 12.

The material feed area includes a feed hopper 20 and a material feed device 16.

The feed hopper 20 may be formed at least in part by hopper walls 21 extending in the longitudinal direction of the crusher 10 and a rear wall 22 extending transversely to the longitudinal direction. The feed hopper 20 leads to the material feed device 16.

As shown in this exemplary embodiment, the material feed device 16 may have a conveyor chute that can be driven by means of a vibratory drive. The feed hopper 20 can be used to feed material to be broken into the crusher 10, for instance using a wheel loader, and to feed it onto the conveyor chute.

From the conveyor chute, the material to be broken passes into the area of a screen unit 30. This screen unit 30 may also be referred to as a pre-screening arrangement. At least one screen deck 30.1, 30.2 is disposed in the area of the screen unit 30. In this exemplary embodiment two screen decks 30.1, 30.2 are used.

A partial fraction of the material to be broken is screened out at the upper screen deck 30.1. This partial fraction already has a sufficient particle size that it no longer needs to be broken in the crusher 10. In this respect, this screened out partial fraction can be routed past a crusher unit 40 through a bypass channel 31.

If a second screen deck 30.2 is used in the screen unit 30, a further fine particle fraction can be screened out from the partial fraction that accumulates below the screen deck 30.1. This fine particle fraction is routed to a lateral discharge conveyor 32 below the screen deck 30.2. The fine particle fraction is diverted from the lateral discharge conveyor 32 and conveyed to a rock pile 70.2 located at the side of the machine.

As FIG. 1 illustrates, the screen unit 30 may be a vibrating screen having a screen drive 33. The screen drive 33 causes the screen deck 30.1 and/or the screen deck 30.2 to vibrate. Owing to the inclined arrangement of the screen decks 30.1, 30.2 and in conjunction with the vibration motions, material on the screen decks 30.1, 30.2 is transported towards the crusher unit 40 or towards the bypass channel 31.

The material to be broken routed from the screen deck 30.1 is routed to the crusher unit 40, as shown in FIG. 1.

The crusher unit 40 may be designed to be a rotary impact crusher unit. However, it can also be any other crusher unit, for instance a jaw crusher unit of a jaw crusher.

The crusher unit 40 has a crushing rotor 42 driven by a motor 41. In FIG. 1, the axis of rotation of the crushing rotor 42 is horizontal in the direction of the image depth.

For instance, the outer periphery of the crushing rotor 42 may be equipped with impact bars 43. Opposite from the crushing rotor 42, for instance, wall elements may be disposed, preferably in the form of impact rockers 44.

When the crushing rotor 42 is rotating, the impact bars 43 throw the material to be broken outwards. In so doing, this material hits the impact rockers 44 and is broken due to the high kinetic energy. When the material to be broken is of sufficient particle size to allow the material particles to pass through the gap between the impact rockers 44 and the radially outer ends of the impact bars 43, the broken material exits the crusher unit 40 through the crusher outlet 45.

It is conceivable that in the area of the crusher outlet 45, the broken material routed from the crusher unit 40 is combined with the material routed from the bypass channel 31 and transferred onto a belt conveyor 13. The belt conveyor 13 can be used to convey the material out of the working area of the crusher unit 40.

As shown in the drawings, the belt conveyor 13 may comprise an endless circulating conveyor belt having a slack side 13.3 and a tight side 13.4. The slack side 13.3 is used to catch and transport away the crushed material falling from the crusher outlet 45 of the crusher unit 40. At the belt ends, deflection rollers 13.1, 13.2 can be used to deflect the conveyor belt from the slack side 13.3 to the tight side 13.4 and vice versa. Guides, in particular support rollers, can be provided in the area between the deflection rollers 13.1, 13.2 to change the conveying direction of the conveyor belt, to shape the conveyor belt in a certain way and/or to support the conveyor belt.

The belt conveyor 13 has a belt drive, which can be used to drive the belt conveyor 13. The belt drive can preferably be disposed at the discharge end 13.5 or in the area of the discharge end 13.5 of the belt conveyor 13.

The belt conveyor 13 can be connected, for instance by means of the belt drive, to a control device by means of a control line.

One or more further belt conveyors 60 and/or a return conveyor 80 may be used, which in principle have the same design as the belt conveyor 13. In this respect, reference can be made to the above statements.

A magnet 14 can be disposed above the slack side 13.3 in the area between the feed end and the discharge end 13.5. The magnet 14 can be used to lift iron parts from the broken material and move them out of the conveying area of the belt conveyor 13.

A re-screening device 50 can be disposed downstream of the belt conveyor 13. The crusher unit 50 has a screen housing 51, in which at least one screen deck 52 is mounted. Below the screen deck 52, a housing base 53 is formed, which is used as a collection space for the material screened out at the screen deck 52.

An opening in the lower housing part creates a spatial connection to the further belt conveyor 60. Here, the further belt conveyor 60 forms its feed area 61, wherein the screened material in the feed area 61 is directed onto the slack side of the further belt conveyor 60. The further belt conveyor 60 conveys the screened material towards its discharge end 62. From there, the screened material is transferred to a rock pile 70.1.

The material not screened out at the screen deck 52 of the re-screening device 50 is conveyed from the screen deck 52 onto a branch belt 54. The branch belt 54 can also be designed as a belt conveyor, i.e., reference can be made to the explanations given above with respect to the belt conveyor 13. In FIG. 1, the transport direction of the branch belt 54 extends in the direction of the image depth.

At its discharge end, the branch belt 54 transfers the un-screened material, also referred to as oversize material, to the feed area 81 of the return conveyor 80. The return conveyor 80, which may be a belt conveyor, conveys the oversize material towards the feed hopper 20. At its discharge end 82, the return conveyor 80 transfers the oversize material into the material flow, specifically preferably into the material feed area. The oversize material can therefore be returned to the crusher unit 40 and crushed to the desired particle size.

Figure 2:
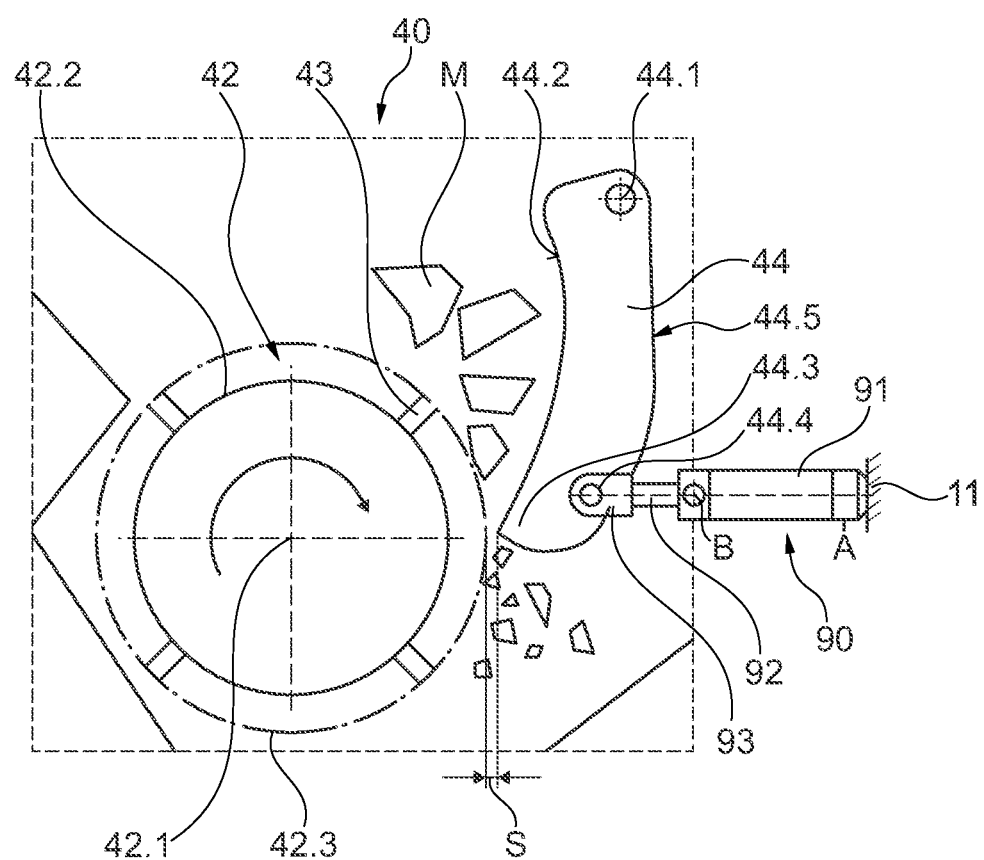
FIG. 2 shows a crusher unit of the crusher of FIG. 1.

FIG. 2 shows the crusher unit 40 of the impact crusher in schematic detail. The crushing rotor 42 is mounted in a housing of the crusher unit 40 rotatable about an axis of rotation 42.1. The motor 41 mentioned above can be used to drive the crushing rotor 42.

Impact bars 43 are mounted on the rotor periphery 42.2. When the crushing rotor 42 rotates, an impact circle 42.3 is formed by the also rotating impact bars 43. Assigned to this impact circle 42.3, an impact rocker 44 is mounted opposite from and swiveling in the direction of motion of the crushed material. A swivel bearing 44.1 is used for this purpose. This swivel bearing 44.1 is used to mount the impact rocker 44 on the chassis 11.

On its end facing the interior of the crusher unit 40, the impact rocker 44 has a wall element 44.2. In the distal end area 44.3, the wall element 44.2 faces the crushing rotor 42 in such a way that a crushing gap S is formed in the area between the impact circle 42.3 and the distal end area 44.3. The crusher outlet 45 described above is formed below the crusher unit 40.

During operation, the material M to be crushed, which is shown schematically in FIG. 2, is fed into the crusher unit 40. This material M is flung outwards by means of the rotating impact bars 43. It then hits the wall element 44.2 of the impact rocker 44 and is crushed both at the impact bar 43 and at the impact rocker 44. If the crushed material M has a particle size smaller than the width of the crushing gap S, it falls down and leaves the crusher unit 40 through the crusher outlet 45. However, if the material M then has a grain size that is not yet sufficiently small, it is repeatedly thrown against the impact rocker 44 until a sufficient degree of comminution is achieved.

A hydraulic cylinder 90 is disposed in the area of the rear end 44.5 of the impact rocker 44. The hydraulic cylinder 90 is used to support the impact rocker 44 such that the width of the crushing gap S is maintained during the crushing operation. Furthermore, the hydraulic cylinder 90 provides the options of changing the width of the crushing gap S if desired by the machine operator and as exemplarily described in DE 10 2010 015 583 B4.

The locking cylinder 90 has a cylinder housing 91. Therein, a piston is adjustably guided. A piston rod 92 is connected to the piston. A piston rod end 93, which is supported by the piston rod 92, is used for coupling to the impact rocker 44. In this case, the piston rod head 93 is swivel coupled to the impact rocker 44 by means of a bearing 44.4.

FIG. 2 illustrates the hydraulic ports A, B the hydraulic cylinder 90 comprises. The hydraulic cylinder 90 can be supplied with hydraulic oil via these hydraulic ports A, B.

In accordance with the invention, the hydraulic cylinder 90 includes an overload protection device. This is detailed in more detail below with reference to FIGS. 3 and 4.

In these illustrations, the rear area of the hydraulic cylinder 90 facing away from the impact rocker 44 is shown magnified.

The rear end of the hydraulic cylinder 90 is closed by a cover 94 at this rear area. When the cover 94 is removed, the pressure chamber of the hydraulic cylinder 90, which is formed between the cylinder base and the piston, is accessible.

A connection area 95 is connected to the cylinder housing 91 of the hydraulic cylinder 90, preferably integrally molded thereto. The connection area 95 also has a plane connection surface 95.1. This plane connection surface 95.1 encompasses a passage opening. The passage opening creates a spatial connection to the pressure chamber of the hydraulic cylinder 90.

As the drawings indicate, a burst panel 100 may be attached to the connection surface 95.1.

Figure 5:
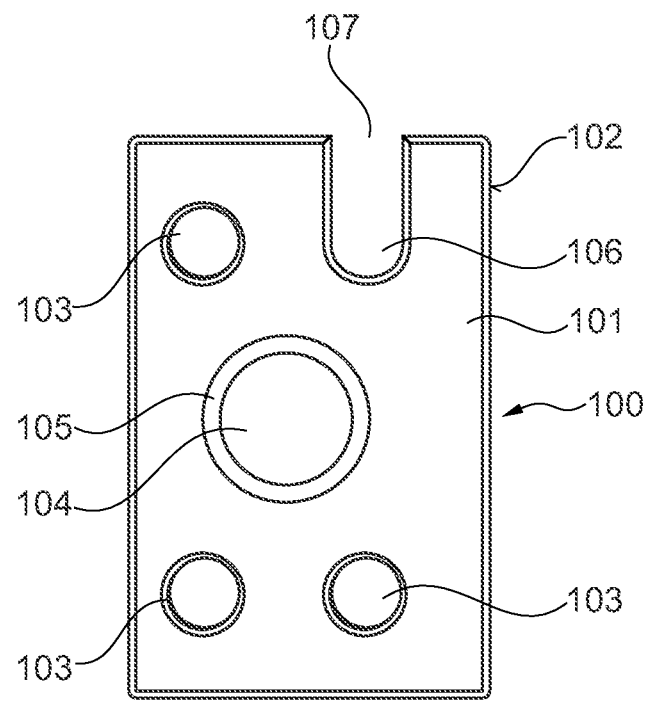
FIG. 5 shows a top view of the burst panel of the overload protection device of FIGS. 3 and 4 and FIG. 6 shows a schematic representation of a part of the hydraulic circuit of the crusher.

The burst panel 100 is shown in more detail in FIG. 5. As this embodiment shows, the burst panel 100 has a planar rear face 101 and a planar front face 102. Centrally, the burst panel 101 has a burst piece 104. The burst piece 104 is integrally connected to the burst panel 100 via a predetermined breaking point 105, which is preferably formed circumferentially. The predetermined breaking point 105 may, for instance, be in the form of a groove formed in the front face 102 and/or in the rear face 101.

The burst panel 100 has bores 103. In this exemplary embodiment, three bores 103 are used. Of course, it is also conceivable that a different number of bores 103, in particular also only one bore 103 is used.

The burst panel 100 has a recess 106 in one area, which is open to the edge area of the burst panel 100 via an insertion section 107.

Figure 3:
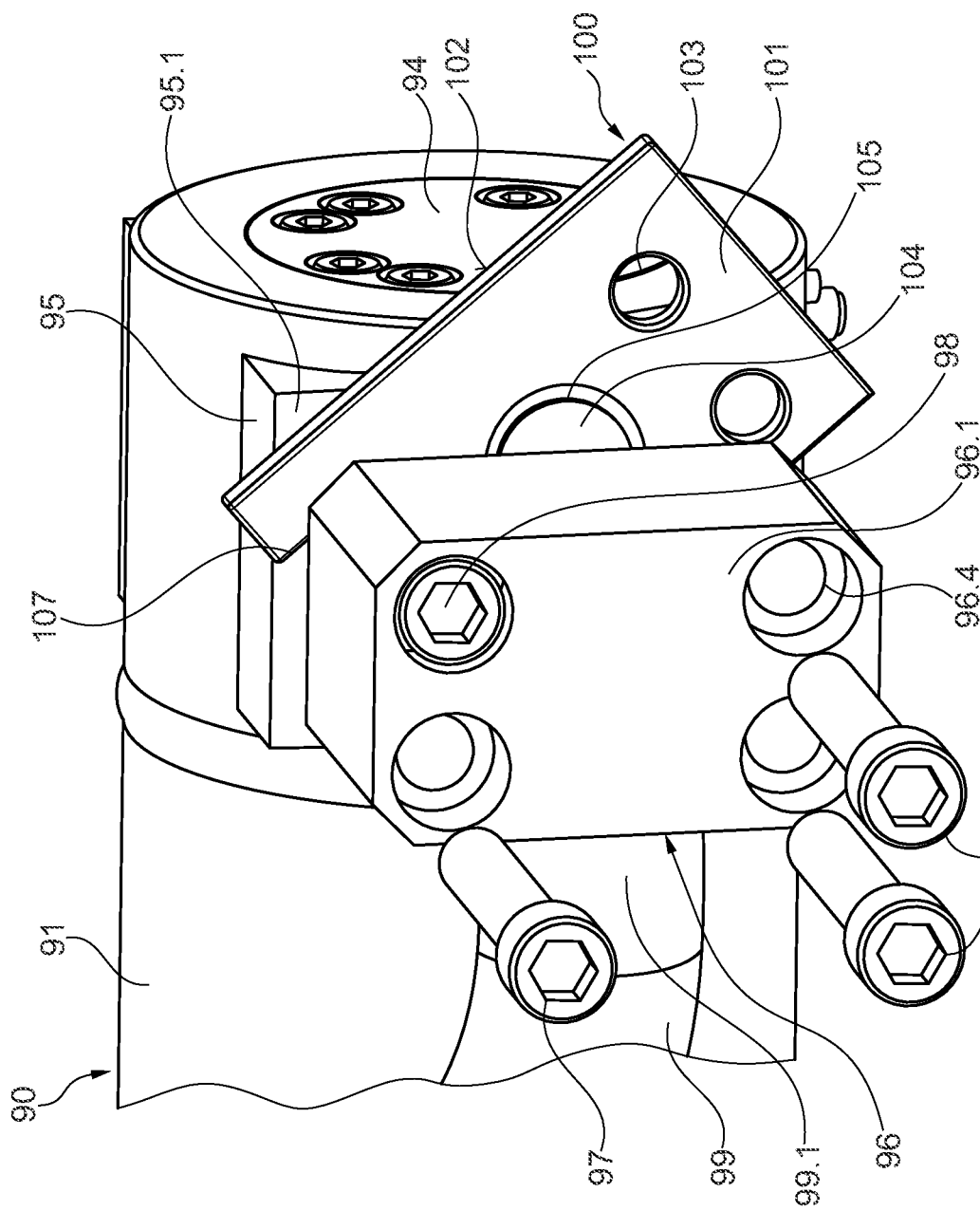
FIG. 3 shows a hydraulic cylinder having an overload protection device.
Figure 4:
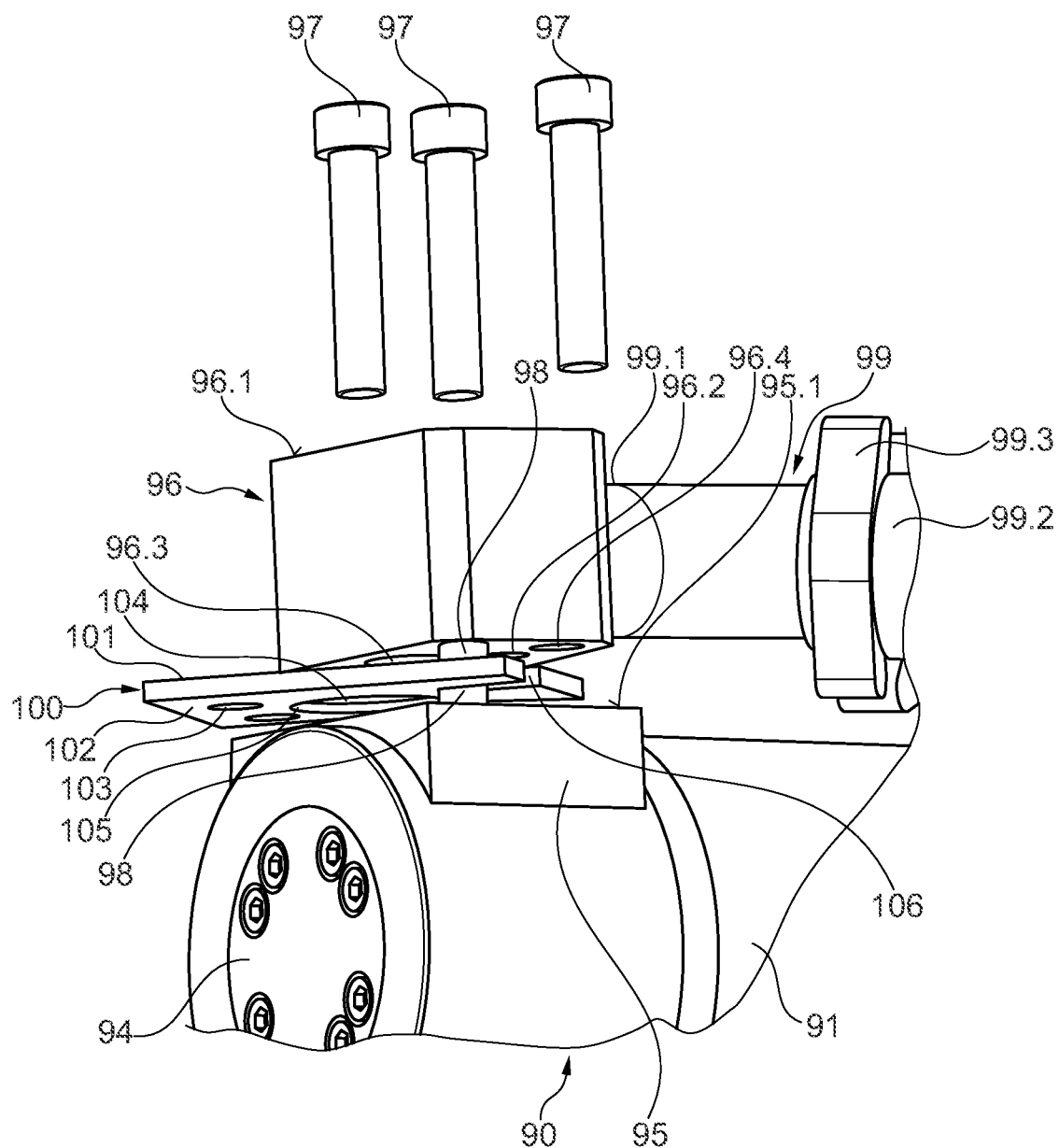
FIG. 4 shows the representation in of FIG. 3 from a different perspective.

As FIGS. 3 and 4 illustrate, the burst panel 100 can be installed between the connection area 95 and a burst panel holder 96.

On its end facing the burst plate 100, the burst panel holder 96 has a pressure surface 96.2. This pressure surface 96.2 can be used to place the burst panel holder 96 on the rear face 101 of the burst panel 100. At its front face 102, the burst panel 100 rests on the connection surface 95.1 of the connection area 95. When assembled, the front face 102 of the burst panel 100 covers the lead-through in the connection surface 95.1. For this purpose, the burst panel 100 is positioned such that the burst piece 104 comes to rest above the lead-through.

FIG. 4 illustrates that the burst panel holder 96 has a lead-through 96.3. In the assembled state, this lead-through 96.3 also comes to rest above the burst piece 104. A channel section of the burst panel holder 96 adjoins the lead-through 96.3. In the area of a line connection 99.1 of the burst panel holder 96, the channel section opens into a hydraulic line 99. The hydraulic line 99 may be configured to include a clamping section 99.3 at its end facing away from the burst panel holder 96. The clamping section 99.3 can be used to form a pipe connection 99.2, to which another hydraulic line can be detachably coupled.

The burst panel holder 96 has four holes, three of which form bolt mounts 96.4 for fastening bolts 97. The drilled holes extend from a cover wall 96.1 to the pressure surface 96.2.

A retaining element 98 is inserted into the drilled hole, which is not occupied by the fastening bolts 97.

The retaining element 98 is also formed by a bolt. The retaining element 98 is inserted through the drilled hole and bolted into a threaded mount of the connection area 95, wherein the threaded mount extends from the connection surface 95.1 into the connection area 95.

Similarly, three additional threaded mounts may be provided for the mounting bolts 97 in the connection area 95.

To mount the burst panel 100, its insertion section 107 can be slid onto the mounted retaining element 98 in the area between the burst panel holder 96 and the connection area 95, as illustrated in FIGS. 3 and 4. The motion is limited by the recess 106, into which the retaining element 98 fits.

The recess 106, in conjunction with a pin section of the retaining element 98, forms a swivel bearing, about which the burst panel 100 can be swiveled and moved to its mounting position. Then the bores 103 are in alignment with the bolt receptacles 96.4.

Now the fastening bolts 97 can be passed through the bolt mounts 96.4 and the bores 103 of the burst panel 100 and bolted into the threaded mounts of the connection area 95. When the mounting bolts 97 are tightened, the burst panel 100 is held clamped in its mounting position between the connection area 95 and the burst panel holder 96 as intended. Finally, the retaining element 98 can also be further bolted into the assigned threaded mount, in that way completing the assembly process.

If an overload situation now occurs during operation, the burst piece 104 ruptures with respect to the burst panel 100 in the area of the predetermined breaking point 105. The hydraulic fluid in the pressure chamber of the hydraulic cylinder 90 can then expand through the lead-through of the connection area 95 and the opening of the burst panel 100 released by the burst piece 104 into the channel section of the burst panel holder 96. From there, the hydraulic fluid is discharged via the hydraulic line 99.

Now it is necessary to repair the overload protection device. In the reverse manner to that described above for the assembly process, the fastening bolts 97 can now be loosened and removed. The retaining element 98 is only released, but remains in the position shown in FIG. 4, i.e. it is not removed. The burst panel 100 is now released and can be removed. For this purpose, the burst panel 100 can be easily pulled off the retaining element 98, wherein the retaining element 98 exits the area of the burst panel 100 through the insertion section 107. Recognizably, the burst panel retainer 96 remains in essence in its mounted position as it remains retained to the connection area 95 by the retaining element 98. As described above, a new burst panel 100 can now be inserted and installed. The overload protection device is then ready for use again.

Figure 6:
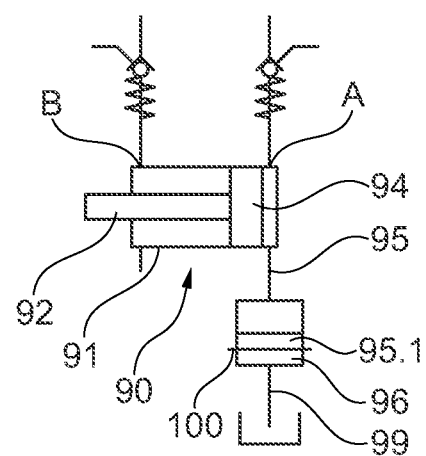

FIG. 6 shows a schematic representation of the overload protection device. As this diagram illustrates, the pressure chamber is connected to a hydraulic system via the hydraulic port A. Another chamber of the hydraulic cylinder 90 is formed on the opposite end of the piston from the pressure chamber. This further chamber is connected to the hydraulic system via the hydraulic port B. To adjust the crushing gap S, the hydraulic oil can be recirculated between the pressure chamber and the further chamber via the hydraulic ports A, B.

The invention claimed is:

1. A mineral material machining plant, comprising:
   a hydraulic element configured to contain a hydraulic fluid, the hydraulic element including a connection area including a passage opening for the hydraulic fluid; and
   an overload protection device, including:
   a replaceable burst panel covering the passage opening, the burst panel including a rear face facing away from the connection area;
   a burst panel holder engaging the rear face of the burst panel;
   at least one fastening bolt configured to pass through a bolt mount of the burst panel holder and through a bore of the burst panel disposed in alignment with the bolt mount, the bore being configured to laterally retain the fastening bolt within the bore so that removal of the burst panel from the burst panel holder requires withdrawal of the fastening bolt longitudinally out of the bore, the bolt being configured to be threaded into a threaded mount of the connection area such that in an assembled state the burst panel is held clamped between a pressure surface of the burst panel holder and a connection surface of the connection area; and
   at least one retaining element, which, in a dismantling position, holds the burst panel holder to the hydraulic element at the connection area when the at least one fastening bolt is unbolted from the threaded mount of the connection area and the burst panel is removed;
   wherein the burst panel includes one or more recesses having a lateral insertion section, wherein the insertion section opens the recess towards one side extending transversely to a plate plane of the burst panel such that the retaining element can be inserted laterally into and removed from the recess transversely to the plate plane of the burst panel.

2. The mineral material machining plant of claim 1, wherein:
   the retaining element is a bolt configured to engage with a bolt section in the recess, and the retaining element is passed through a further bolt mount of the burst panel holder and the recess and is bolted into a further threaded mount defined in the connection surface of the connection area.

3. The mineral material machining plant of claim 1, wherein:
   the burst panel includes a planar front face resting on the connection surface of the connection area and the rear face is a planar rear face resting on the pressure surface of the burst panel holder such that the burst panel is held clamped between the connection surface and the pressure surface.

4. The mineral material machining plant of claim 1, wherein:
   the retaining element forms a swivel bearing with a section of the recess, the swivel bearing having a swivel axis transverse to the connection surface, such that the burst panel can be swiveled out of its mounting position when the at least one fastening bolt is removed.

5. The mineral material machining plant of claim 1, wherein:
   the burst panel includes a burst piece having a predetermined breaking point.

6. The mineral material machining plant of claim 5, wherein:
   the predetermined breaking point includes a cross-sectional weakening.

7. The mineral material machining plant of claim 1, wherein:
   the burst panel holder includes a lead-through covered by the burst panel in the assembled state of the burst panel holder; and
   a channel section of the burst panel holder adjoins the lead-through such that the channel section leads to a line connection configured to connect a hydraulic line to the burst panel holder.

8. The mineral material machining plant of claim 1, wherein:
   the hydraulic element is a hydraulic cylinder including a cylinder housing, a piston adjustably guided in the cylinder housing, and a piston rod connected to the piston, the piston rod including a piston rod head guided out of the cylinder housing, wherein the piston delimits a pressure chamber, and wherein the pressure chamber is spatially connected to the passage opening of the connection area.

9. The mineral material machining plant of claim 8, wherein:
   the piston rod of the hydraulic cylinder is coupled to a wall element of a crusher unit by a swivel bearing, and the wall element is held in a swiveling manner on a chassis by means of a further bearing.

10. The mineral material machining plant of claim 9, wherein:
    the wall element is part of an impact rocker of a rotary impact crusher.

11. A method of repairing a mineral material machining plant, the mineral material machining plant including:
    a hydraulic element configured to contain a hydraulic fluid, the hydraulic element including a connection area including a passage opening for the hydraulic fluid; and
    an overload protection device, including:
    a replaceable burst panel covering the passage opening, the replaceable burst panel including a rear face facing away from the connection area, and the replaceable burst panel including one or more recesses having a lateral insertion section;
    a burst panel holder engaging the rear face of the replaceable burst panel;
    at least one fastening bolt configured to pass through a bolt mount of the burst panel holder and through a bore of the replaceable burst panel into a threaded mount of the connection area; and
    at least one retaining element;

the method comprising:

loosening and removing the at least one fastening bolt in a longitudinal direction relative to the bore of the replaceable burst panel;

keeping the burst panel holder connected to the connection area with the at least one retaining element;

removing the replaceable burst panel;

inserting a new burst panel into the overload protection device, wherein the new burst panel includes at least one bore configured to laterally retain the at least one fastening bolt within the at least one bore and a recess having a lateral insert section that opens towards one side extending transversely to a plate plane of the new burst panel;

reinserting the at least one fastening bolt into the bolt mount of the burst panel holder and into said at least one bore of the new burst panel, the reinserting being in a longitudinal direction relative to the at least one bore of the new burst panel; and threading the at least one fastening bolt into the threaded mount of the connection area.

12. The method of claim 11, wherein:

the removing the burst panel includes moving the burst panel in a lateral direction parallel to a plate plane of the burst panel such that the retaining element is moved laterally through the lateral insertion section and out of the recess.

13. The method of claim 11, wherein:

the inserting the new burst panel includes moving the new burst panel in a lateral direction parallel to a plate plane of the burst panel such that the retaining element is moved laterally into the lateral insertion section of the recess.

14. The method of claim 11, wherein:

the retaining element forms a swivel bearing with a section of the recess, the swivel bearing having a swivel axis transverse to a connection surface of the connection area; and wherein the removing the burst panel includes swiveling the burst panel out of its mounting position after the at least one fastening bolt is removed.

* * * * *